(12) United States Patent
Banvait et al.

(10) Patent No.: US 10,403,140 B2
(45) Date of Patent: Sep. 3, 2019

(54) PROPAGATION OF ALERTS REGARDING TRAFFIC EVENTS

(71) Applicant: Ford Global Technologies, LLC, Dearborn, MI (US)

(72) Inventors: Harpreetsingh Banvait, Dearborn, MI (US); Jinesh J. Jain, Dearborn, MI (US); Surjya Sarathi Ray, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/087,181

(22) PCT Filed: Mar. 21, 2016

(86) PCT No.: PCT/US2016/023415
§ 371 (c)(1),
(2) Date: Sep. 21, 2018

(87) PCT Pub. No.: WO2017/164837
PCT Pub. Date: Sep. 28, 2017

(65) Prior Publication Data
US 2019/0088126 A1  Mar. 21, 2019

(51) Int. Cl.
*G08G 1/0967* (2006.01)
*H04W 4/46* (2018.01)
*G08G 1/16* (2006.01)
*B60W 30/12* (2006.01)
*G08G 1/01* (2006.01)

(52) U.S. Cl.
CPC ....... *G08G 1/096791* (2013.01); *B60W 30/12* (2013.01); *G08G 1/0112* (2013.01); *G08G 1/096725* (2013.01); *G08G 1/096741* (2013.01); *G08G 1/162* (2013.01); *G08G 1/166* (2013.01); *G08G 1/167* (2013.01); *H04W 4/46* (2018.02)

(58) Field of Classification Search
CPC .......... G08G 1/096791; G08G 1/0112; G08G 1/166; G08G 1/167; H04W 4/46; B60W 30/12
USPC .......................................... 340/933
See application file for complete search history.

(56) References Cited

U.S. PATENT DOCUMENTS

| | | | | |
|---|---|---|---|---|
| 8,995,662 | B2 * | 3/2015 | Rubin | G08G 1/166 380/255 |
| 9,478,137 | B1 * | 10/2016 | Nelson | G08G 1/167 |
| 9,598,076 | B1 * | 3/2017 | Jain | G08G 1/167 |
| 9,988,047 | B2 * | 6/2018 | Johnson | G08G 1/167 |

(Continued)

*Primary Examiner* — John A Tweel, Jr.
(74) *Attorney, Agent, or Firm* — David R. Stevens; Stevens Law Group (57) ABSTRACT

In response to detecting a traffic event such as a motorcycle lane splitting or an accident, a vehicle broadcasts a notification over a V2V communication channel. Traffic events may be detected using sensor systems of the vehicle or in response to messages reporting the event. Notifications may be received from the vehicle over a cellular communication channel. Roadside infrastructure, such as DSRC or cellular communication installations receive the notification and may rebroadcast it to adjacent vehicles. A DSRC installation may broadcast the message by way of a cellular communication installation and vice versa. The vehicle may provide a cellular notification by way of a driver's mobile device connected to a controller of the vehicle.

20 Claims, 8 Drawing Sheets

(56) References Cited

U.S. PATENT DOCUMENTS

| | | | | |
|---|---|---|---|---|
| 2012/0229301 A1* | 9/2012 | Goodwin | ............... | G08G 1/162 |
| | | | | 340/902 |
| 2013/0083679 A1* | 4/2013 | Krishnaswamy | ...... | G08G 1/093 |
| | | | | 370/252 |
| 2015/0166062 A1* | 6/2015 | Johnson | ................ | G08G 1/167 |
| | | | | 701/41 |
| 2016/0306357 A1* | 10/2016 | Wieskamp | ............. | G08G 1/166 |
| 2017/0305465 A1* | 10/2017 | Mielenz | .......... | B60W 30/18145 |
| 2018/0275650 A1* | 9/2018 | Nelson | ................... | G08G 1/166 |

\* cited by examiner

PROPAGATION OF ALERTS REGARDING TRAFFIC EVENTS

BACKGROUND

FIELD OF THE INVENTION

This invention relates to performing obstacle avoidance in autonomous vehicles.

BACKGROUND OF THE INVENTION

In many congested, urban areas like San Francisco, Calif. or London, UK, motorcyclists often overtake slow or stopped vehicles in the traffic by traveling between lanes, namely lane-splitting. This is a very dangerous driving activity since it is hard for drivers in adjacent vehicles to detect such activities, especially when lanes are merging. Even for future autonomous vehicles, which might have built-in 360 degree sensing systems, it would be challenging to identify fast moving objects like motorcycles changing lanes at much higher relative speeds. This difficulty would present challenges to the overall sensing suites and algorithms. It is further problematic where objects or vehicles occlude a sensing system.

Accidents are likewise common on busy streets. An accident involving a single vehicle or two vehicles may quickly propagate resulting in large pile-ups of vehicles. In particular, after the accident, the time available for a driver or autonomous vehicle to brake decreases with increasing distance from the accident inasmuch as the reaction time of the drivers in front will increase the delay before the driver is aware of the accident and can react.

The systems and methods disclosed herein provide an improved approach for dealing with rapidly occurring situations such as lane-splitting vehicles and accidents.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
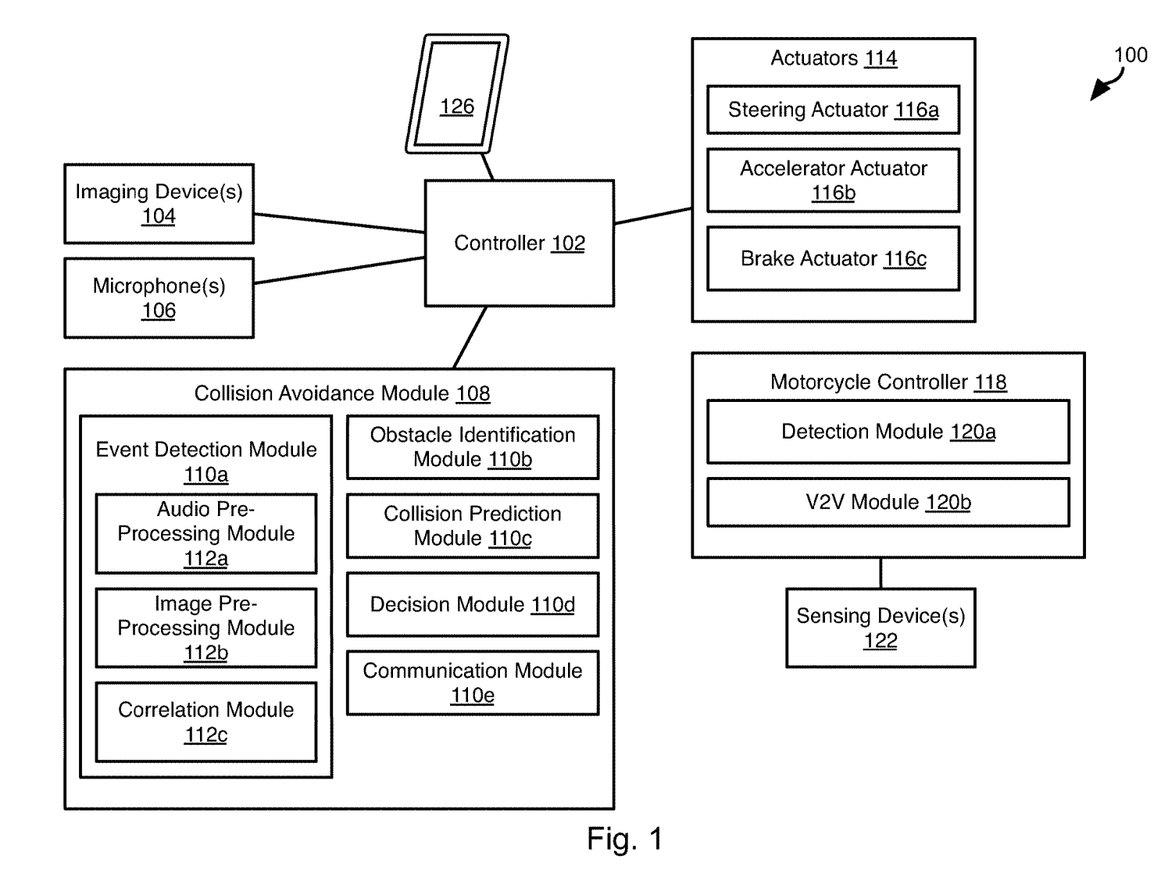
FIG. 1 is a schematic block diagram of a system for implementing embodiments of the invention.

Referring to FIG. 1, a controller 102 may be housed within a vehicle. The vehicle may include any vehicle known in the art. The vehicle may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. In particular, image data and audio data may be analyzed to identify motorcycles that may be lane-splitting as discussed in greater detail below with respect to FIGS. 3 and 4.

The controller 102 may receive one or more image streams from one or more imaging devices 104. For example, one or more cameras may be mounted to the vehicle and output image streams received by the controller 102. The controller 102 may receive one or more audio streams from one or more microphones 106. For example, one or more microphones 106 or microphone arrays 106 may be mounted to the vehicle and output audio streams received by the controller 102. The microphones 106 may include directional microphones having a sensitivity that varies with angle.

The controller 102 may execute a collision avoidance module 108 that receives the image streams and audio streams and identifies possible obstacles and takes measures to avoid them. In the embodiments disclosed herein, only image and audio data is used to perform collision avoidance. However, other sensors to detect obstacles may also be used such as RADAR (Radio Distancing and Ranging), LIDAR (Light Distancing and Ranging), SONAR (Sound Navigation and Ranging), and the like.

The collision avoidance module 108 may include an event detection module 110a. The event detection module 110a may include an audio pre-processing module 112a that is programmed to process the one or more audio streams in order to identify features that could correspond to a motorcycle, accident, or other traffic event. The event detection module 110a may include an image pre-processing module 112b that is programmed to process the one or more image streams in order to identify images, movements, behaviors, or other visual cues that may correspond to a motorcycle, motorcyclists, or driving patterns characteristic of a motorcycle. The image pre-processing module 112b may further analyze the one or more image streams to detect movements, behaviors, or other visual cues that correspond to the occurrence of an accident or an accident scene.

The event detection module 110a may further include a correlation module 112c that receives audio features identified by the audio pre-processing module 112a and visual cues identified by the image pre-processing module 112b and estimates some or all of the presence of a motorcyclist in proximity to the autonomous vehicle, whether the motorcyclist is lane-splitting, and the location of the motorcyclist. Likewise, the correlation module 112c may receive audio features identified by the audio pre-processing module 112a and visual cues identified by the image pre-processing module 112b and estimate whether an accident has occurred and the location of the accident. The function of the modules 112a-112c may be as described in U.S. application Ser. No. 14/920,369 filed Oct. 22, 2015 and entitled DETECTION OF LANE-SPLITTING MOTORCYCLES, which is hereby incorporated herein by reference in its entirety.

The collision avoidance module 108 may further include an obstacle identification module 110b, a collision prediction module 110c, and a decision module 110d. The obstacle identification module 110b analyzes the one or more image streams and identifies potential obstacles, including people, animals, vehicles, buildings, curbs, and other objects and structures. In particular, the obstacle identification module 110b may identify vehicle images in the image stream.

The collision prediction module 110c predicts which obstacle images are likely to collide with the vehicle based on its current trajectory or current intended path. The decision module 110d may make a decision to stop, accelerate, turn, etc. in order to avoid obstacles. The manner in which the collision prediction module 110c predicts potential collisions and the manner in which the decision module 110d takes action to avoid potential collisions may be according to any method or system known in the art of autonomous vehicles.

The decision module 110d may control the trajectory of the vehicle by actuating one or more actuators 114 controlling the direction and speed of the vehicle. For example, the actuators 114 may include a steering actuator 116a, an accelerator actuator 116b, and a brake actuator 116c. The configuration of the actuators 116a-116c may be according to any implementation of such actuators known in the art of autonomous vehicles.

The collision avoidance module 108 may further include a communication module 110e. The communication module 110e both receives notifications regarding traffic events and transmits notifications of traffic events, either in response to received notifications or in response to detection of the traffic events using the event detection module 110a.

A motorcycle may include a motorcycle controller 118 including a detection module 120a that detects when the motorcycle is lane splitting, such as using one or more sensing devices 122. Detecting lane-splitting may include implementing some or all of the methods and systems disclosed in U.S. application Ser. No. 14/741,591, filed Jun. 17, 2015, and entitled DETECTING AND COMMUNICATING LANE SPLITTING MANEUVER and PCT Application Serial Number US2015/056446 filed Oct. 20, 2015 and entitled FACILITATING LANE-SPLITTING BY MOTORCYCLES, which are hereby incorporated herein by reference in their entirety.

Sensing devices 122 may include a forward facing camera and the detection module 120a may detect lane-splitting by detecting that a lane marker is within threshold proximity to a center of the field of view of the forward facing camera. The detection module 120a may also detect lane splitting by determining a separation between vehicles on either side of the camera. If the distance is below some threshold distance, e.g. less than 50% of a lane width, then the detection module 120a may determine that the motorcycle is lane splitting.

The motorcycle controller 118 may include a V2V module 120b configured to communicate with the communication modules 110e of other vehicles. As described in greater detail herein, the V2V module 120b may notify other vehicles that the motorcycle is lane-splitting.

A driver of a vehicle including a controller 102 or a motorcycle including a motorcycle controller 118 may have a mobile device 126 (e.g. cell phone, tablet computer, wearable computer, or other computing device) capable of cellular communication. Cellular communication devices and protocols mentioned herein may include any cellular communication protocol known in the art, such as Third Generation (3G), Fourth Generation (4G), Long Term Evolution (LTE), Fifth Generation (5G), or the like. The mobile device 126 may be located on the person of a driver or in a pocket or other storage location on the motorcycle itself. The controller 102 or motorcycle controller 118 may connect to the mobile device 126 by means of a wireless communication protocol such as BLUETOOTH, Wi-Fi, or the like. In some instances, the mobile device 126 may be integral to the controller 102, 118, i.e. a built-in cellular communication system. Notifications as described herein regarding traffic events may be sent or received using the mobile device 126 as described in greater detail below.

Figure 2:
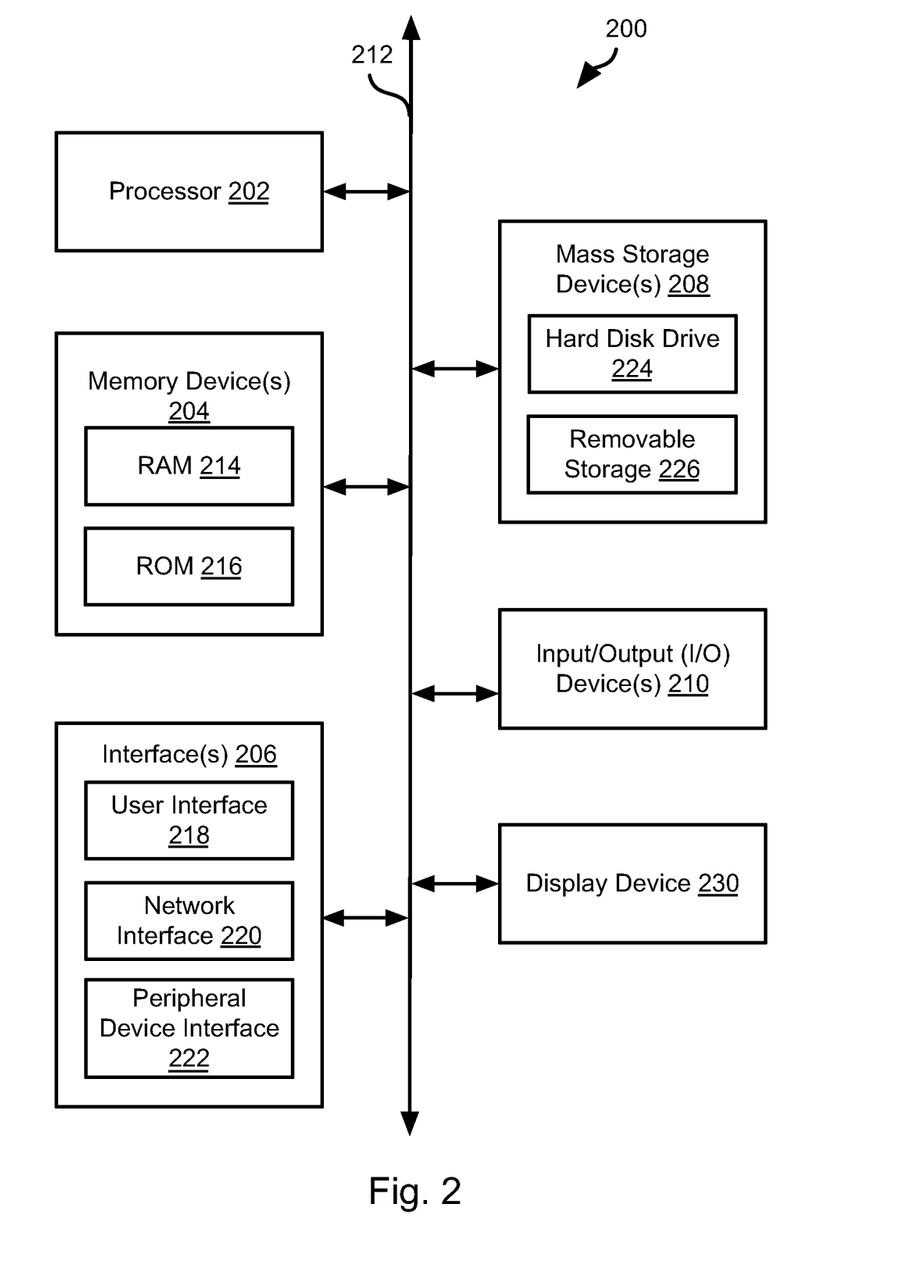
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controllers 102, 118 and mobile device 126 may have some or all of the attributes of the computing device 200.

Computing device 200 includes one or more processor(s) 202, one or more memory device(s) 204, one or more interface(s) 206, one or more mass storage device(s) 208, one or more Input/Output (I/0) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
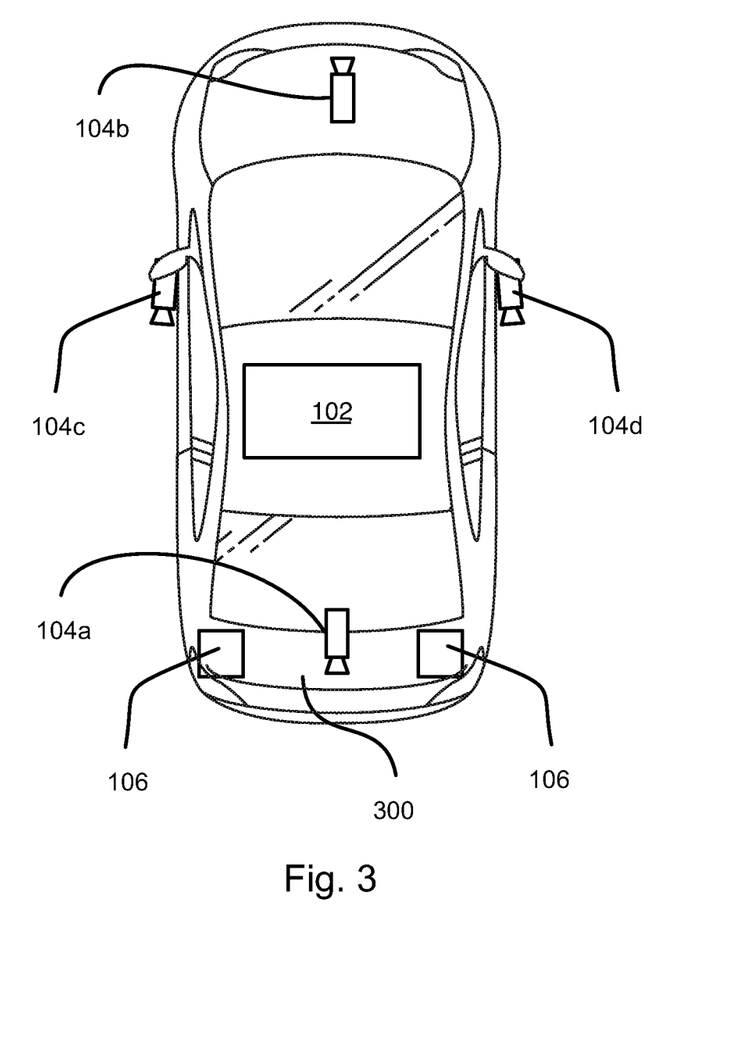
FIG. 3 is a schematic diagram of an autonomous vehicle in accordance with an embodiment of the present invention.

Referring to FIG. 3, a vehicle 300 may include the controller 102 housed therein as well as imaging devices 104 and microphones 106 mounted thereto. The vehicles described herein below may have some or all of the attributes of the vehicle 300. As shown, the imaging devices 104 may include a rear facing camera 104a, such as conventional back-up camera. A forward facing camera 104b may be mounted to the vehicle 300. The illustrated embodiment further includes lateral cameras 104c, 104d mounted to sides of the vehicle 300, such as to the front doors proximate the side mirrors or mounted to the side mirrors themselves. The lateral cameras 104c, 104d may have an optical axis that is angled relative to the longitudinal axis (front to back) of the vehicle 300 in order to provide a broader field of view.

The microphones 106 may be mounted to a rear of the vehicle. Each microphone 106 shown may be an individual microphone or array of microphones. The microphones 106 may be directional microphones that are sensitive to sounds originating within a limited angular range. The microphones 106 shown are located at opposite sides of the vehicle 300 in order to enable estimation of the direction from which a detected sound originated. In some embodiments, the microphones 106 may include a microphone located in the cabin of the vehicle, such as a microphone used for detecting voice commands or enabling hands-free telephone calls.

Figure 4:
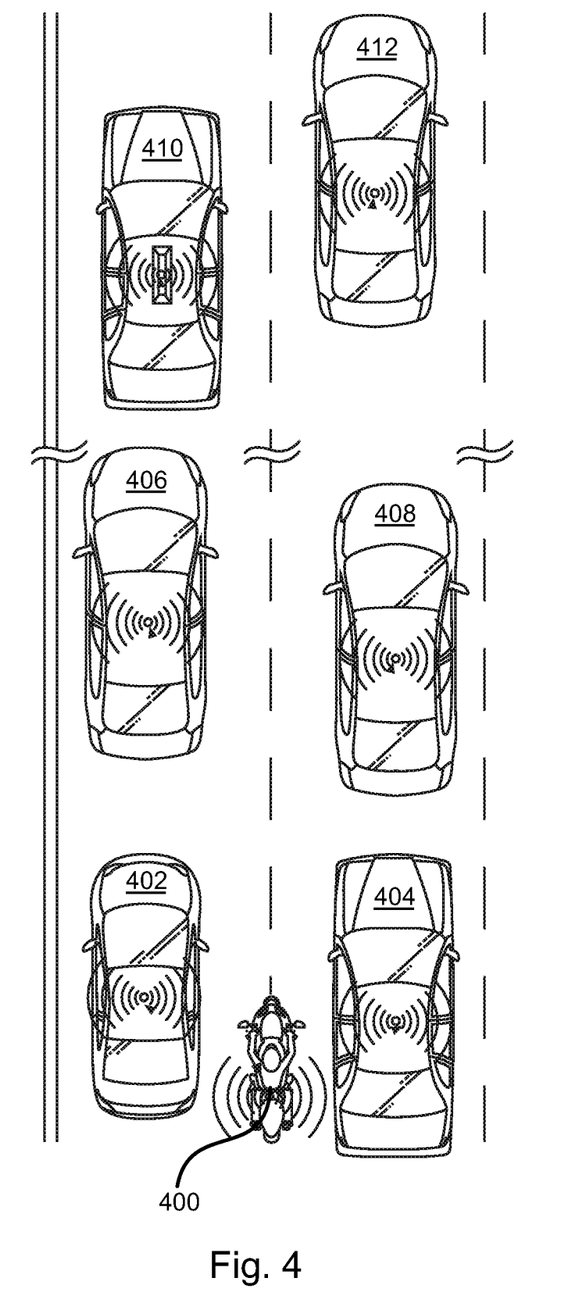
FIG. 4 is a schematic diagram illustrating communication among vehicles in the presence of a lane-splitting vehicle.

Referring to FIG. 4, DSRC (Dedicated Short Range Communications) provides a communication link between vehicles and roadside beacons (infrastructure) for road transport and traffic telematics (RTTT) applications. DSRC is expected to become standard for all vehicles in the United States beginning 2018. The systems and methods disclosed herein provide an early warning to vehicles about approached motorcycles in traffic congestion. DSRC is one example of V2V (vehicle-to-vehicle) communication. However, other types of V2V communication may also be used to implement the V2V communications described herein.

As shown in FIG. 4, a motorcycle 400 is trying to lane split between vehicles 402-412. Vehicles 410, 412 are much further ahead as indicated by the break lines. There may be as many as 8 to 10 more cars in each lane between vehicles 410, 402 in the left lane and vehicles 412, 404 in the right lane.

The motorcycle 400 in some instances is not equipped with a DSRC transceiver. When the motorcycle 400 lane-splits in a congested traffic, it is sensed by one or both of vehicles 402, 404 using on-board sensors such as imaging device 104, microphone 106, or other sensor system. The manner in which the lane-splitting motorcycle 400 is detected by the controller 102 may be performed using the methods disclosed in U.S. application Ser. No. 14/920,369 filed Oct. 22, 2015 and entitled DETECTION OF LANE-SPLITTING MOTORCYCLES, which is hereby incorporated herein by reference in its entirety. Vehicles 402, 404 may then use their on-board DSRC transceivers (e.g. communication module 110e) to alert DSRC equipped vehicles 406-412 within a 300-meter radius by sending a 'motorcycle approaching' packet. The 'motorcycle approaching' packet may include a DSRC packet having a flag, e.g. data field, bit setting, or payload data, indicating that a motorcycle is approaching, e.g. while lane-splitting.

The 'motorcycle approaching' packet may be relayed by vehicles 402, 404 to vehicles 406-412 over DSRC data connections between these vehicles. For example, vehicle 402 may establish DSRC connections to some or all of vehicles 406-412. Likewise, vehicle 404 may establish DSRC connections to some or all of vehicles 406-412. The 'motorcycle approaching' packet is then transmitted over these DSRC connections.

The 'motorcycle approaching' packet may be forwarded by vehicles 406, 408 to vehicles 410, 412. For example, vehicles 406, 408 may have DSRC connections to both at least one of the vehicles 402, 404 and at least one of the vehicles 410, 412. The vehicles 406, 408 may then receive the 'motorcycle approaching' packet from at least one of the vehicles 402, 404 and forward the packet to at least one of the vehicles 410, 412.

In some embodiments, the vehicles 402-412 may have DSRC connections to roadside infrastructure. Accordingly, vehicles 402, 404, vehicles 406, 408, or all of these vehicles, may transmit the 'motorcycle approaching' packet to the roadside infrastructure, which then retransmits the 'motorcycle approaching' packet to the vehicles 410, 412. In this manner, vehicles 410, 412 may be much further ahead than the limit of the DSRC communications of the vehicles 402, 404 or the vehicles 406, 408.

While the 'motorcycle approaching' packet is received well in advance, this can be further validated by the vehicles 406-412 using their own sensing suites (if any) when the motorcycle eventually does pass by them. In this manner, there can also be a confidence metric associated with this message and the further validation continues to increase or maintain this confidence. For example, in response to receiving the 'motorcycle approaching' packet, the controller 102 of the vehicle 406-412 may initialize a confidence metric to an initial value. The confidence metric may then be increased by the controller 102 if the sensors of the vehicle 406-412 detect the motorcycle, e.g. within some time threshold (e.g. 1 to 4 seconds) of receiving the 'motorcycle approaching' packet. The confidence metric may be further increased an amount for each vehicle from which the 'motorcycle approaching' message has been received, i.e. within some time interval (e.g. within up to 100 ms to 4 seconds from each other). The obstacle identification module 110b may then evaluate the confidence metric. If the confidence metric is below a threshold, the possibility of a lane-splitting motorcycle may be ignored. If it is above a threshold, a lane-splitting motorcycle may be added to a set of potential obstacles used by the collision prediction module 110c to identify possible collisions.

In some embodiments, the motorcycle 400 may include a motorcycle controller 118 that is capable of detecting that the motorcycle 400 is lane splitting. Detecting lane splitting may include receiving an explicit input from the driver of the motorcycle. Detecting lane-splitting may include executing some or all of the methods described in U.S. application Ser. No. 14/741,591, filed Jun. 17, 2015, and entitled DETECTING AND COMMUNICATING LANE SPLITTING MANEUVER and PCT Application Serial Number US2015/056446 filed Oct. 20, 2015 and entitled FACILITATING LANE-SPLITTING BY MOTORCYCLES, which are hereby incorporated herein by reference in their entirety.

In such embodiments, the motorcycle 400 may establish DSRC connections to some or all of the vehicles within the transmission radius of its DSRC transceiver. This may include the vehicles 402-408 and possibly the vehicles 410, 412. The motorcycle 400 may then transmit the 'motorcycle approaching' packet to these vehicles over the connections. One or more of the vehicles 402-408 may forward the 'motorcycle approaching' packet to the vehicles 410, 412. One or more of the vehicles 402-408 or the motorcycle 400 itself may forward the 'motorcycle approaching' packet to roadside infrastructure, which then forwards the message to vehicles 410, 412 that may be outside the transmission range of the DSRC transceiver of the vehicle 402-408 or motorcycle 400.

Figure 5:
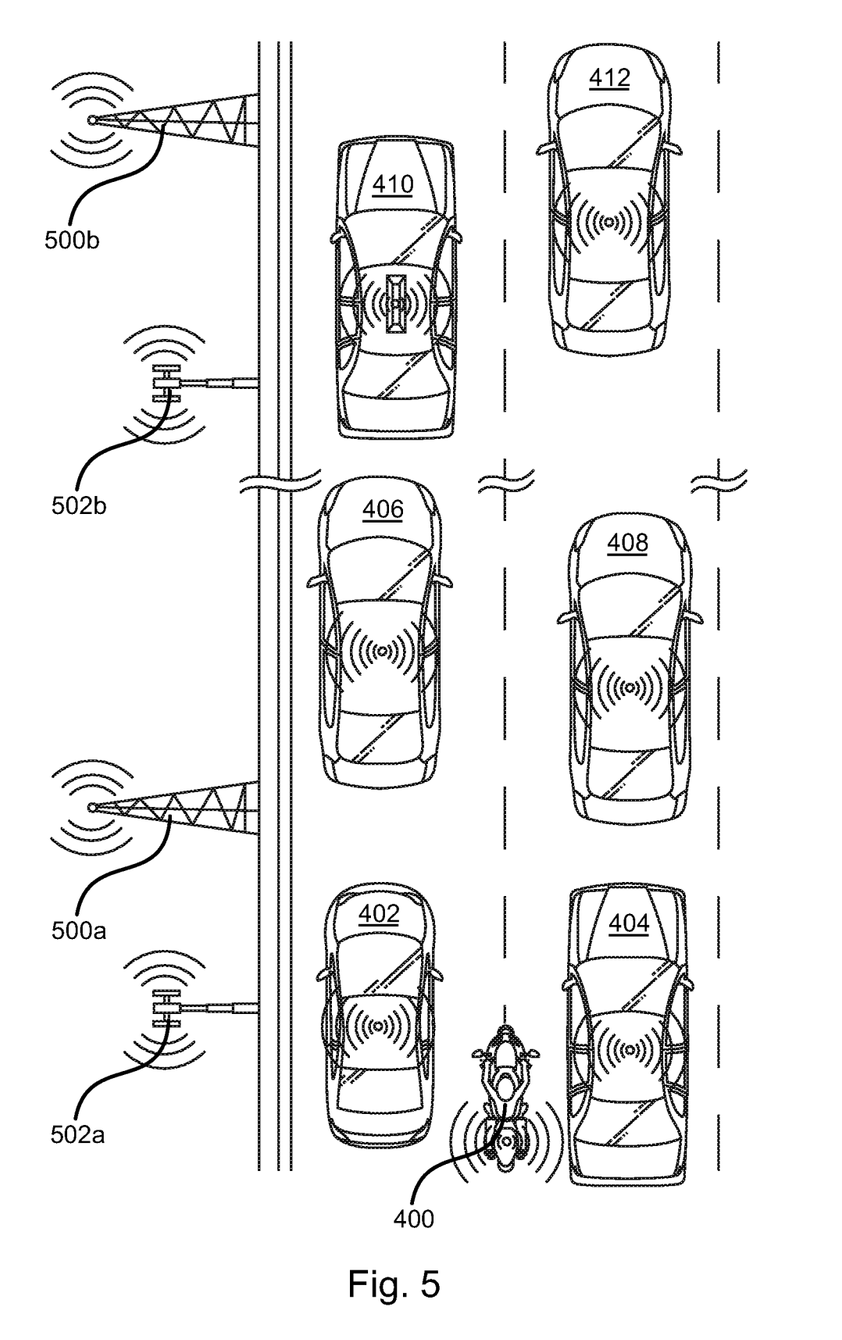
FIG. 5 is a schematic diagram illustrating communication among vehicles and roadside infrastructure in the presence of a lane-splitting vehicle.

Referring to FIG. 5, in some embodiments the broadcast of the 'motorcycle approaching' packet may be facilitated using both DSRC and cellular communication devices and infrastructure. In particular, one or more DSRC installations 500a, 500b may be distributed along the roadside. The DSRC installations 500a, 500b may be in communication with one another by means of a cable or a wireless communication channel. Likewise, one or more cellular communication installations 502a, 502b may be distributed along the roadside at the same or different locations from the DSRC installations 500a, 500b. The cellular communication installations 502a, 502b may be in communication with one another by means of a wired or wireless connection. The cellular communication installations 502a, 502b may be in communication with one or more of the DSRC installations 500a, 500b by means of a wired or wireless connection.

Accordingly, a motorcycle 400 or some or all of the vehicles 402-412 may establish a connection or otherwise transmit to one of the DSRC installations 500a, 500b or cellular communication installations 502a, 502b. For example, in the case where the motorcycle 400 lacks DSRC capability or does not detect any DSRC capable vehicles within the range of its DSRC transceiver, the motorcycle 400 may invoke transmission of the 'motorcycle approaching' packet to the DSRC installation 500a, 500b or to the cellular communication tower 502a.

Upon receiving the 'motorcycle approaching' packet, the DSRC installation 500a, 500b or cellular communication installation 502a, 502b may then retransmit to one or more of a DSRC installation 500a, 500b, a cellular communication installation 502a, 502b, a DSRC transceiver of a vehicle 406-412, or a cellular device 126 associated with a vehicle 406-412.

For example, communication paths may include some or all of the following examples.

1. The vehicle 402, 404 or motorcycle 400 transmits a 'motorcycle approaching packet' by DSRC to the DSRC installation 500a, which transmits the packet by a wired or wireless connection to the DSRC installation 500b. The DSRC installation 500b then broadcasts the packet to vehicles in its proximity, namely the vehicles 410, 412.
2. The vehicle 402, 404 or motorcycle 400 transmits a 'motorcycle approaching packet' by DSRC to the DSRC installation 500a, which transmits the packet by a wired or wireless connection to a cellular communication installation 502b. Cellular communication installation 502b then broadcasts the packet to cellular mobile devices 126 in its proximity, such as mobile phones or built in cellular communication devices of the vehicles 410, 412.
3. The vehicle 402, 404 or motorcycle 400 transmits a 'motorcycle approaching packet' by a cellular communication protocol to the cellular communication installation 502a, which transmits the packet by a wired or wireless connection to the cellular communication installation 502b. Cellular communication installation 502b then broadcasts the packet to cellular mobile devices 126 in its proximity, such as mobile phones or built in cellular communication devices of the vehicles 410, 412.
4. The vehicle 402, 404 or motorcycle 400 transmits a 'motorcycle approaching packet' by a cellular communication protocol to the cellular communication installation 502a, which transmits the packet by a wired or wireless connection to the DSRC installation 500b. The DSRC installation 500b then broadcasts the packet using DSRC to vehicles in its proximity, namely the vehicles 410, 412.

The above are just a few examples of communication paths between a vehicle 402, 404 or motorcycle and another vehicle 410, 412. The use of the roadside installations 500a, 500b, 502a, 502b enables communication beyond the limits of DSRC transceivers of vehicles and in the absence of DSRC transceivers installed in vehicles.

Figure 6:
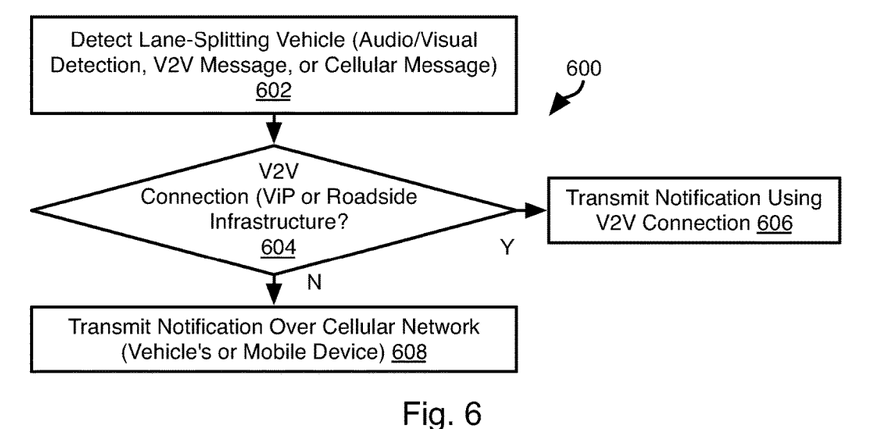
FIG. 6 is a process flow diagram of a method for transmitting notifications in accordance with an embodiment of the present invention.

Referring to FIG. 6, a controller 102, 118 or a DSRC installation 500a, 500b (hereinafter "the device") may execute the illustrated method 600 in response to receiving the 'motorcycle approaching' packet. The DSRC installations 500a, 500b may have some or all of the attributes of computing device 200 such that they have sufficient logical capacity to execute the methods disclosed herein.

The method 600 may include detecting 602 a lane-splitting vehicle. Detecting 602 may include any of the methods described above, including sensing of the lane-splitting vehicle using sensors providing outputs to the controller 102, 118. Detecting 602 may include receiving a V2V (e.g. DSRC) message, e.g. the 'motorcycle approaching' packet. Detecting 602 may include receiving a message by the device indicating a lane-splitting vehicle in the form of a message received over a cellular communication network. The 'motorcycle approaching' packet may be sent over the cellular communication network and may have the same or different formatting as for the DSRC version of the 'motorcycle approaching' packet.

The method 600 may include evaluating 604 whether a V2V (e.g. DSRC) connection exists between the device and one or more V2V devices (adjacent vehicles or a DSRC installation 500a, 500b ). If so, then the method 600 may include transmitting 606 a notification (e.g. 'motorcycle approaching' packet) to some or all of the connected V2V devices. If not, the method 600 may include transmitting 608 a notification indicating an approaching lane-splitting vehicle over a cellular network. Where the device is a vehicle, this may include invoking transmission of the message using a mobile device 126 (e.g. a mobile phone) located within the vehicle or an integrated cellular communication device 126. Where the device is a cellular communication installation 502a, 502b this may include transmitting 608 the notification to mobile devices 126 in proximity to the installation 502a, 502b, e.g. within the transmission range of the installation 502a, 502b. Where the device is a DSRC installation 500a, 500b, transmitting 608 a cellular notification may include transmitting the notification to a cellular communication installation 502a, 502b with an instruction to broadcast the notification to cellular devices within range of the installation 502a, 502b.

Figure 7:
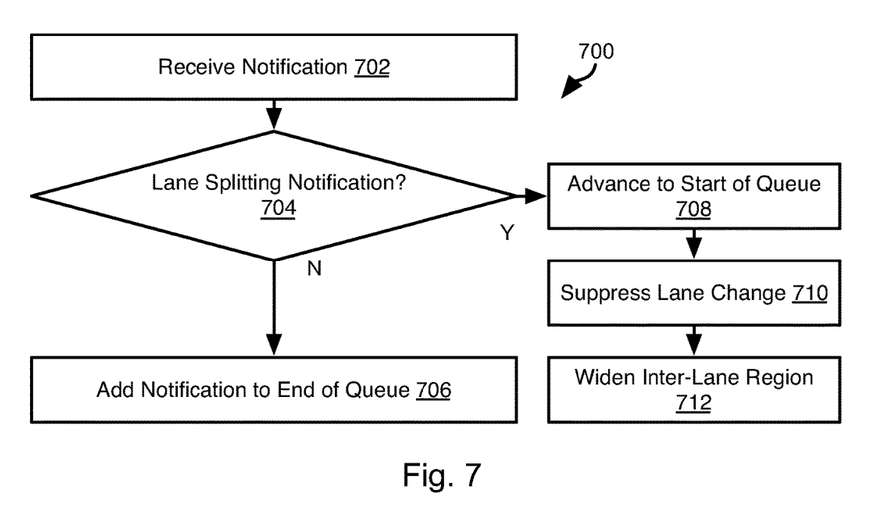
FIG. 7 is a process flow diagram of a method for processing notifications in accordance with an embodiment of the present invention.

Referring to FIG. 7, the illustrated method 700 may be executed by a controller 102, 118 or a DSRC installation 500a, 500b (hereinafter "the device").

The method 700 includes receiving 702 a notification over a DSRC connection. If the message is found 704 not to be a lane-splitting notification, e.g. the 'motorcycle approaching' packet, the method 700 may include adding 706 the notification to the end of a notification queue. Notifications in the queue are processed and removed starting at the top of the queue, i.e. the opposite from the end of the queue such that a first-in-first-out ordering is implemented.

If the message is found 704 to be a lane-splitting notification, e.g. the 'motorcycle approaching' packet, then the method 700 may include advancing 708 the notification to the top of a queue of received notifications, even if there are previously received notifications still in the queue. In this manner, the 'motorcycle approaching' packet will be processed next, regardless of previously received notifications that have not been processed. Inasmuch as lane-splitting motorcycles may travel much faster than traffic, there may be little time to react to the 'motorcycle approaching' packet. Accordingly, the packet is placed at the top of the queue functioning as a first-in-first-out (FIFO) buffer.

The notifications in the queue may then be processed and removed from the top of the queue. For the 'motorcycle approaching' packet, processing may include actions such as suppressing 710 lane changes and widening 712 an inter-lane region, where the device is the controller 102 of an autonomous vehicle. For example, a controller 102 performing autonomous navigation may autonomously invoke lane changes in preparation for exiting the freeway or to avoid slower vehicles. In response to receiving the packet, the controller 102 may avoid 710 for a time period, e.g. 10 to 20 seconds, at least some lane changes that would be performed for the sake of reaching a destination or passing slower vehicles.

Widening 712 the inter-lane region may include causing, by the controller, the vehicle to move away slightly (e.g. 6 inches to one foot) from an inter-lane region to provide room for the lane-splitting vehicle to pass while still remaining in the lane by a safe margin.

Where the device is a DSRC installation 500a, 500b or a controller 102, processing notifications may include executing the method 600 of FIG. 6 in order to forward the packet to another device. Other processing that is performed for the notifications in the queue of whatever type may also be performed according to any method known in the art of V2V communications.

Figure 8:
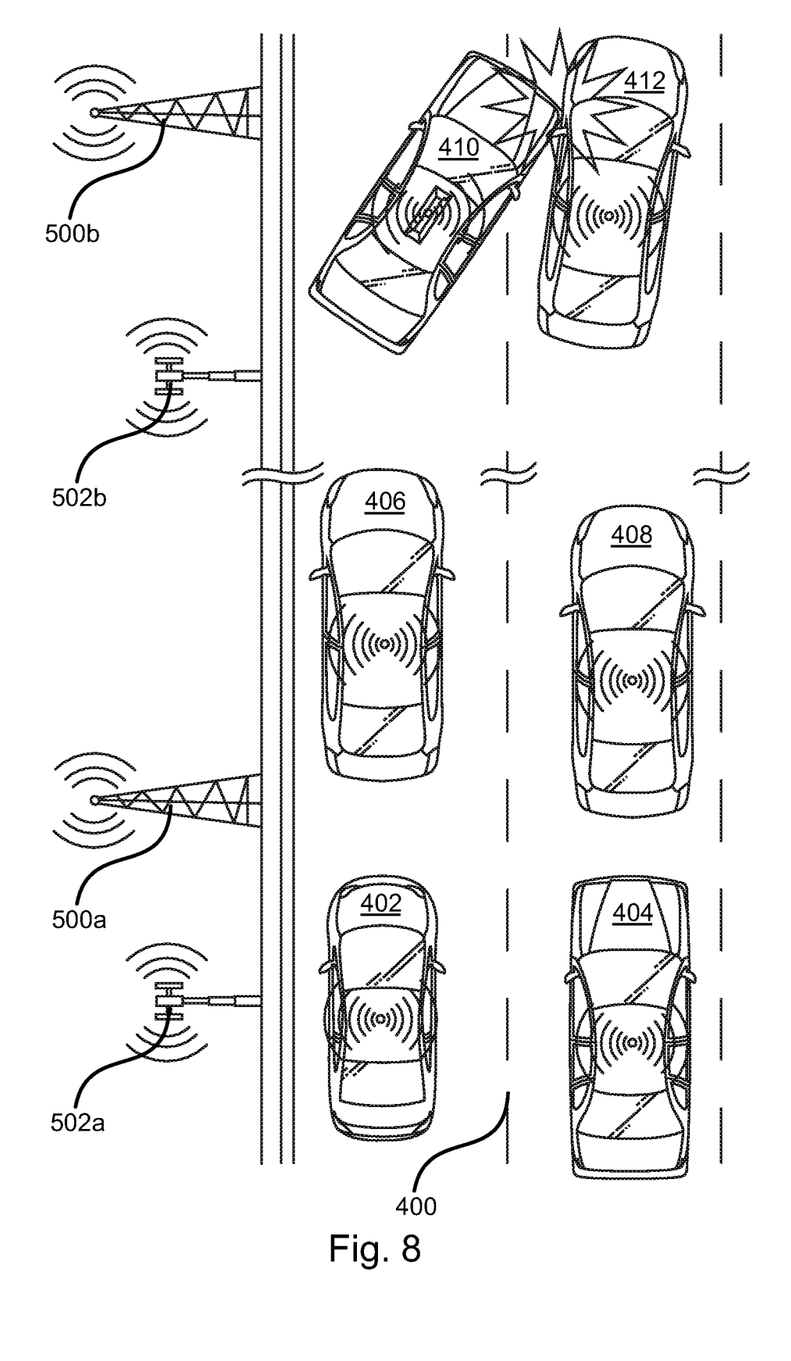
FIG. 8 is a schematic diagram illustrating communication among vehicles in response to an accident in accordance with an embodiment of the present invention.

Referring to FIG. 8, an accident between vehicles 410, 412 or involving one of vehicles 410, 412 may be detected by the vehicles 410, 412 themselves. Detecting may include the controller 102 of one or both of the vehicles 410, 412 detecting that it has been in accident. This may include the controller 102 receiving a signal indicating that an airbag of the vehicle has deployed or receiving an output of an accelerometer indicating an abnormal movement, such as a deceleration exceeding some threshold value or movement indicating rolling or sideways movement of the vehicle.

In response to detecting that the vehicle 410, 412 housing has been in an accident, the controller 102 may be programmed to invoke transmission of notification to surrounding vehicles 402-408 or DSRC installations 500*a*, 500*b*, e.g. an 'accident warning' packet. The transmission radius of the transceivers of the vehicles 410, 412 may be on the order of 300 meters whereas the transmission radius of the DSRC installations 500*a*, 500*b* is on the order of one kilometer. Accordingly, upon receiving the 'accident warning' packet, the installations 500*a*, 500*b* may rebroadcast the packet over DSRC connections to distant vehicles, such as vehicles 402, 404 that may be out of the transmission range of the vehicles 410, 412.

In some instances, adjacent vehicles 406, 408 may not have DSRC transceivers and/or there may not nearby DSRC installations 500*a*, 500*b*. In such instances, the controllers 102 may invoke transmission of the 'accident warning' packet, i.e. a cellular protocol version thereof, using a mobile device 126, such as a driver's cell phone or built in cellular communication device 126.

In some instances, the vehicles 410, 412 may lack communication capabilities. In such instances, vehicles 406, 408 may detect the accident involving one or both of vehicles 410, 412 using one or more sensors systems, such as imaging devices 104 or microphones 106. Visual detection may include detecting the cessation of movement or rapid deceleration (e.g. exceeding a pre-defined threshold) of one or both of the vehicles 410, 412. Visual detection may include detecting that one vehicle 410 is contacting the other vehicle 412 in one or more images captured by the imaging devices 104. Visual detection may include detecting movement of a vehicle 410, 412 in an image stream that does not correspond to normal forward motion, e.g. rolling or sideways motion. Audio detection may include detecting sounds exceeding a loudness threshold or having an acoustic signature corresponding to the collision of one car with another. In some embodiments, a determination is made based on both acoustic and visual data, i.e. in response to determining that both acoustic and visual data indicate that an accident occurred.

Upon detecting an accident involving vehicles 410, 412, one or more adjacent vehicles 406, 408 may transmit the 'accident warning' packet in the same manner described above with respect to the vehicles 410, 412, i.e. over DSRC to another vehicle or DSRC installation 500*a*, 500*b* or over a cellular communication channel if DSRC connections or capabilities are not available to the vehicles 406, 408. Likewise, the 'accident warning' packet may be received by one of the DSRC installations 500*a*, 500*b* and rebroadcast to distant vehicles 402, 404 that are beyond the transceiver range of the vehicles 406, 408. The DSRC installation 500*b* may transmit the 'accident warning' packet to vehicles 402, 404 directly or by way of another DSRC installation 500*a*, that receives the 'accident warning' packet from installation 500*b* and forwards it to the vehicles 402, 440.

As for other embodiments disclosed herein, cellular communication installations 502*a*, 502*b* may also be present along a roadway. Accordingly, various transmission paths are possible a vehicle 410, 412 in an accident, or an adjacent vehicle 406, 408 that detects an accident to a distant vehicle 402, 404 in order to provide time to react to the accident.

For example, the following scenarios may be implemented.

1. DSRC installation 500*b* receives the 'accident warning' packet from one or more of the vehicles 408-412 and transmits the 'accident warning' packet to DSRC installation 500*a* over a wired or wireless connection. DSRC installation 500*a* then transmits the 'accident warning' packet via DSRC to vehicles 402, 404 that are behind the vehicles 410, 412 involved in the accident.
2. DSRC installation 500*b* receives the 'accident warning' packet from one or more of the vehicles 408-412. The DSRC installation 500*b* forwards the packet to a cellular communication installation 502*b* over a cellular, DSRC, or wired connection. The cellular communication installation 502*b* then broadcasts a message warning of the accident to connected cellular devices, such as mobile devices 126 located within vehicles 402-408 or built-in cellular communication devices 126.
3. A cellular communication installation 502*b* receives the 'accident warning' packet from a mobile device 126 or built in cellular communication device in one or more of the vehicles 406-412. The cellular communication installation 502*b* forwards the 'accident warning' packet to DSRC installation 500*a* by way of a cellular, DSRC, or wired connection. DSRC installation 500*a* receives the 'accident warning' and transmits the 'accident warning' packet via DSRC to vehicles 402, 404 that are behind the vehicles 410, 412 involved in the accident.
4. A cellular communication installation 502*b* receives the 'accident warning' packet from a mobile device 126 or built in cellular communication device in one or more of the vehicles 406-412. The cellular communication installation 502*b* transmits the 'accident warning' packet over a cellular connection to vehicles 402, 404 either directly or by forwarding the packet to the vehicles 402, 404 by way of another cellular communication installation 502*a*.

Figure 9:
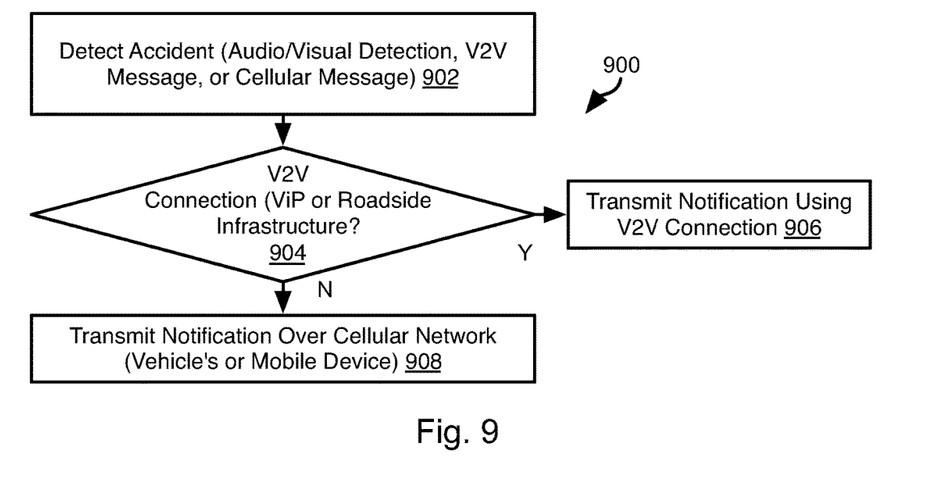
FIG. 9 is a process flow diagram of a method for providing notifications of accidents in accordance with an embodiment of the present invention.

Referring to FIG. 9, a controller 102, 118 or a DSRC installation 500*a*, 500*b* (hereinafter "the device") may execute the illustrated method 900 in response to receiving the 'accident warning' packet. The DSRC installations 500*a*, 500*b* may have some or all of the attributes of computing device 200 such that they have sufficient logical capacity to execute the methods disclosed herein.

The method 900 may include detecting 902 an accident. Detecting 902 may include any of the methods described above, including sensing of the accident using using sensors providing outputs to the controller 102, 118. Detecting 902 may include receiving a V2V (e.g. DSRC) message, e.g. the 'accident warning' packet. Detecting 902 may include receiving a message by the device indicating that an accident has occurred in the form of a message received over a cellular communication network. The 'accident warning' packet may be sent over the cellular communication network and may have the same or different formatting as for the DSRC version of the 'accident warning' packet.

The method 900 may include evaluating 904 whether a V2V (e.g. DSRC) connection exists between the device and one or more V2V devices (adjacent vehicles or a DSRC installation 500a, 500b ). If so, then the method 900 may include transmitting 906 a notification (e.g. 'accident warning' packet) to some or all of the connected V2V devices. If not, the method 600 may include transmitting 908 a notification indicating an approaching lane-splitting vehicle over a cellular network. Where the device is a vehicle, this may include invoking transmission of the message using a mobile device 126 (e.g. a mobile phone) located within the vehicle or an integrated cellular communication device 126. Where the device is a cellular communication installation 502a, 502b this may include transmitting 908 the notification to mobile devices 126 in proximity to the installation 502a, 502b, e.g. within the transmission range of the installation 502a, 502b. Where the device is a DSRC installation 500a, 500b, transmitting 908 a cellular notification may include transmitting the notification to a cellular communication installation 502a, 502b with an instruction to broadcast the notification to cellular devices within range of the installation 502a, 502b.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed is:

1. A method comprising performing by a vehicle controller:
    detecting a lane-splitting vehicle;
    in response to detecting the lane-splitting vehicle, transmitting a first message including a lane-splitting flag (LS flag);
    detecting a second message including the LS flag; and
    in response to the LS flag, processing the second message ahead of one or more previously received messages not including the LS flag.
2. The method of claim 1, wherein processing the second message by the vehicle controller further includes refraining from invoking lane changes by a vehicle housing the vehicle controller in response to the second message.
3. The method of claim 1, wherein processing the second message by the vehicle controller further includes invoking movement of a vehicle housing the vehicle controller away from an inter-lane region in response to the second message.
4. The method of claim 1, wherein transmitting the first message comprises transmitting a first vehicle-to-vehicle (V2V) packet directly to another vehicle over a V2V transmission protocol.
5. The method of claim 4, wherein the V2V transmission protocol is Dedicated Short Range Communications (DSRC) protocol.
6. The method of claim 5, wherein transmitting the first V2V packet includes transmitting the first V2V packet to a roadside DSRC station.
7. The method of claim 1, further comprising:
    evaluating, by the vehicle controller, whether there are any V2V connections to the vehicle controller;
    determining, by the vehicle controller, that there are no V2V connections to the vehicle controller;
    in response to determining that there are no V2V connections to the vehicle controller, invoking transmission of the first message using a cellular communication protocol.
8. The method of claim 7, wherein invoking transmission of the first message using the cellular communication protocol comprises invoking communication with a fixed cellular communication tower.
9. The method of claim 7, wherein transmitting the first message using the cellular communication protocol comprises instructing a mobile phone located in a vehicle housing the vehicle controller to transmit a third message.
10. The method of claim 1, wherein detecting the lane-splitting vehicle by the vehicle controller comprises at least one of:
    receiving a vehicle-to-vehicle (V2V) message from the lane-splitting vehicle over a V2V protocol;
    receiving a message from the lane-splitting vehicle over a cellular network protocol; and
    detecting the lane-splitting vehicle according to an acoustic signature of the lane-splitting vehicle in an output of one or more microphones coupled to the vehicle controller.
11. A system comprising:
    a vehicle;
    a vehicle controller housed in the vehicle, the vehicle controller programmed to
    detect a lane-splitting vehicle;
    in response to detecting the lane-splitting vehicle, transmit a first message including a lane-splitting flag (LS flag);
    detect a second message including the LS flag; and
    in response to the LS flag, process the second message ahead of any previously received messages not including the LS flag.
12. The system of claim 11, wherein the vehicle controller is further programmed to process the second message by refraining from invoking lane changes by the vehicle in response to the second message.
13. The system of claim 11, wherein processing the second message by the vehicle controller further includes invoking movement of a vehicle housing the vehicle controller away from an inter-lane region in response to the second message.
14. The system of claim 11, wherein the vehicle controller is further programmed to transmit the first message by transmitting a first vehicle-to-vehicle (V2V) packet directly to another vehicle over a V2V transmission protocol.
15. The system of claim 14, wherein the V2V transmission protocol is Dedicated Short Range Communications (DSRC) protocol.
16. The system of claim 15, wherein the vehicle controller is further programmed to transmit the first V2V packet includes transmitting the first V2V packet to a roadside DSRC station.
17. The system of claim 11, wherein the vehicle controller is further programmed to:
    evaluate whether there are any V2V connections to the vehicle controller;
    if there are no V2V connections to the vehicle controller, invoking transmission of the first message using a cellular communication protocol;
    if there is at least one V2V connection to the vehicle controller, invoking transmission of the first message over the V2V connection using a V2V transmission protocol.
18. The system of claim 17, wherein the vehicle controller is further programmed to invoke transmission of the first message using the cellular communication protocol by invoking communication with a fixed cellular communication tower.

19. The system of claim 18, wherein the vehicle controller is further programmed to transmit the first message using the cellular communication protocol by instructing a mobile phone located in the vehicle to transmit a third message.

20. The system of claim 11, wherein the vehicle controller is further programmed to detect the lane-splitting vehicle by at least one of:
- receiving a vehicle-to-vehicle (V2V) message from the lane-splitting vehicle over a V2V protocol;
- receiving a message from the lane-splitting vehicle over a cellular network protocol; and
- detecting the lane-splitting vehicle according to an acoustic signature of the lane-splitting vehicle in an output of one or more microphones coupled to the vehicle controller.

* * * * *